(12) United States Patent
Reichl et al.

(10) Patent No.: US 6,650,109 B1
(45) Date of Patent: Nov. 18, 2003

(54) PATH MEASURING INSTRUMENTS WITH FLUX CONDUCTING PARTS

(75) Inventors: Asta Reichl, Stuttgart (DE); Thomas Klotzbuecher, Rudersberg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/913,563
(22) PCT Filed: Apr. 13, 2000
(86) PCT No.: PCT/DE00/01143
§ 371 (c)(1), (2), (4) Date: Aug. 15, 2001
(87) PCT Pub. No.: WO00/63649
PCT Pub. Date: Oct. 26, 2000

(30) Foreign Application Priority Data

Apr. 17, 1999 (DE) .......................................... 199 17 465

(51) Int. Cl.⁷ ................................................ G01B 7/14
(52) U.S. Cl. ................................ 324/207.2; 324/207.24
(58) Field of Search ....................... 324/207.2, 207.24, 324/207.21, 207.26; 338/32 R, 32 H

(56) References Cited

U.S. PATENT DOCUMENTS 4,712,064 A    12/1987    Eckardt et al.

FOREIGN PATENT DOCUMENTS

| DE | 29 23 644 C2 | 12/1981 |
| DE | 32 18 298 A1 | 12/1982 |
| DE | 692 02 939 TS | 3/1996 |
| DE | 44 37 751 A | 4/1996 |
| DE | 44 00 616 C2 | 9/1998 |
| DE | 298 17 399 U | 4/1999 |

OTHER PUBLICATIONS

Eberhardt et al: "Anwendung Von Feldplatten . . . ", Siemens–Bauteile–Informationen, BD. 6, NR. Oct. 5, 1968, pp. 172–177.

*Primary Examiner*—Jay Patidar
(74) *Attorney, Agent, or Firm*—Michael J. Striker

(57) ABSTRACT

A measuring instrument for contactless detection of a path c is comprised of a two-part (14, 15) base plate (11), a side plate (16), and a movable part (12). The movable part (12) has a support plate (25) which is guided through a slot (26) in the side plate (16). At one end (27) of the support plate (25), there is a permanent magnet (28) which is embodied as smaller than the path (c). The magnet (28) can be embodied in one piece or in several pieces. Through the disposition of the magnet (28), it is possible to produce different sections, e.g. plateaus or sections deviating form the linear measurement line, in the measurement curve detected by the measuring instrument.

7 Claims, 6 Drawing Sheets

PATH MEASURING INSTRUMENTS WITH FLUX CONDUCTING PARTS

BACKGROUND OF THE INVENTION

The invention relates to a measuring instrument. DE 29 23 644 C2 has disclosed a sensor which has a cylindrically embodied frame comprised of ferromagnetic material. A permanent magnet is moved in sliding fashion in the frame and its movement is proportional to the movement of a component. In addition, a magnetic field-sensitive element is disposed in a gap in the frame and is consequently enclosed in the magnetic circuit produced by the magnet and its output signal is proportional to the movement of the magnet. However, since the magnet slides directly on the inside of the frame, high friction losses can occur which distort the output signal.

SUMMARY OF THE INVENTION

The measuring instrument according to the invention has the advantage over the prior art that in a particularly simple manner, the support of the magnet serves to transmit the movement to be measured and serves as a support for the magnet and simultaneously also contributes to the conduction of the magnetic flux. By varying the length of the magnet and/or dividing it into individual sections, it is easy to produce a measurement curve with one or more plateaus.

Because of its simple design the sensor can be integrated into various systems for a relatively low installation cost, e.g. a throttle measuring instrument, a pedal module for a brake and gas pedal sensor, or can be used as a separate sensor in throttle valve sensors or a vehicle body deflection device.

BRIEF DESCRIPTION OF THE DRAWINGS

Exemplary embodiments of the invention are shown in the drawings and will be explained in detail in the subsequent description.

DESCRIPTION OF THE PREFERRED EMBODIMENTS

Figure 1:
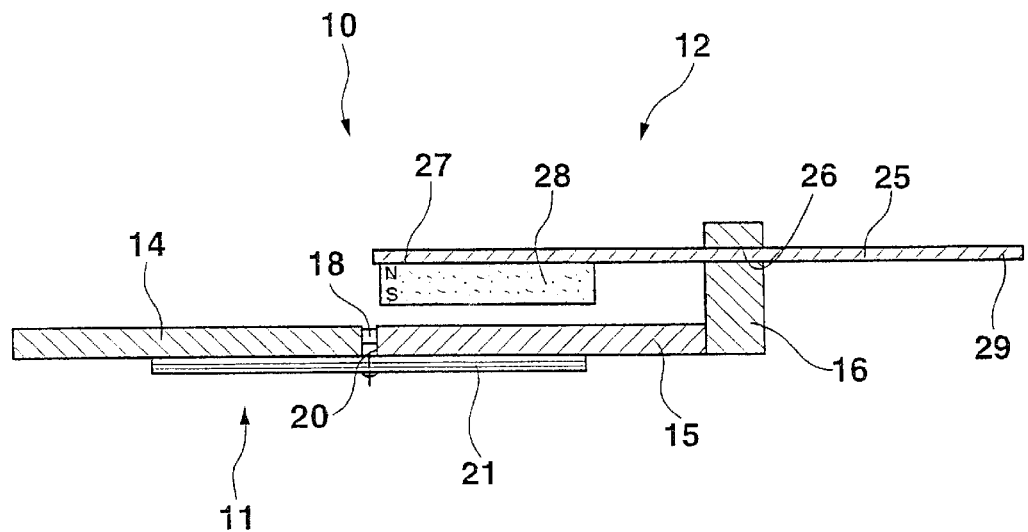
FIGS. 1 and 2 show a longitudinal section and a top view of a first exemplary embodiment.

In FIG. 1, a sensor is labeled 10, which has a stator 11 and a movable part 12. The stator 11 is comprised of a base plate comprised of two parts 14, 15, and a side plate 16, which is disposed approximately perpendicular to the base plate. The two parts 14, 15 of the base plate and the side plate 16 are comprised of magnetically conductive material, for example soft iron. Between the two parts 14, 15 of the base plate, there is a gap 18 in which a magnetic field-sensitive element 20 is disposed. For example a photoresistance cell, a magnetic transistor, coils, magnetoresistive elements, or a Hall element can be used as the magnetic field-sensitive element 20. In this connection, it is important that the output signal of the magnetic field-sensitive component have as linear as possible a dependence on the magnetic induction B. The Figs. respectively show a measurement with the aid of a single magnetic field-sensitive element, a Hall element. In this instance, the element should be disposed as close to the center of the gap 18 as possible. However, it would also be possible, for example, to dispose additional magnetic field-sensitive elements in order, for example, to be able to execute a so-called redundant measurement (safety measurement). Lines lead from the magnetic field-sensitive element 20 to a printed circuit board 21 disposed on the underside of the parts 14, 15 of the base plate.

The movable part 12 is comprised of a support plate 25, which is likewise comprised of a magnetically conductive material such as soft iron. The support plate 25 protrudes through a recess 26 embodied in the side plate 16. The end 27 of the support plate 25 protruding into the sensor 10 has a magnet, i.e. a permanent magnet 28. The other end 29 of the support plate 25 is disposed outside the sensor 10. On this end 29, there is a component, not shown, whose movement is to be detected.

The permanent magnet 28 has a polarization direction perpendicular to the movement direction R of the support plate 25, i.e. its polarization is aligned perpendicular to the base plate and parallel to the side plate 16. In FIG. 1, the permanent magnet 28 is embodied as shorter than its total measurement range c. This also means that the permanent magnet 28 is not as long as the part 15 of the base plate. The permanent magnet 28 is disposed on the side of the support plate 25 oriented toward the base plate. In addition, a small gap is disposed between the permanent magnet 28 and the surface of the base plate in order to permit a slight mobility of the movable part 12 in relation to the stator 11. This gap, however, should be kept as small as possible and should be constant during the measurement.

Figure 3:
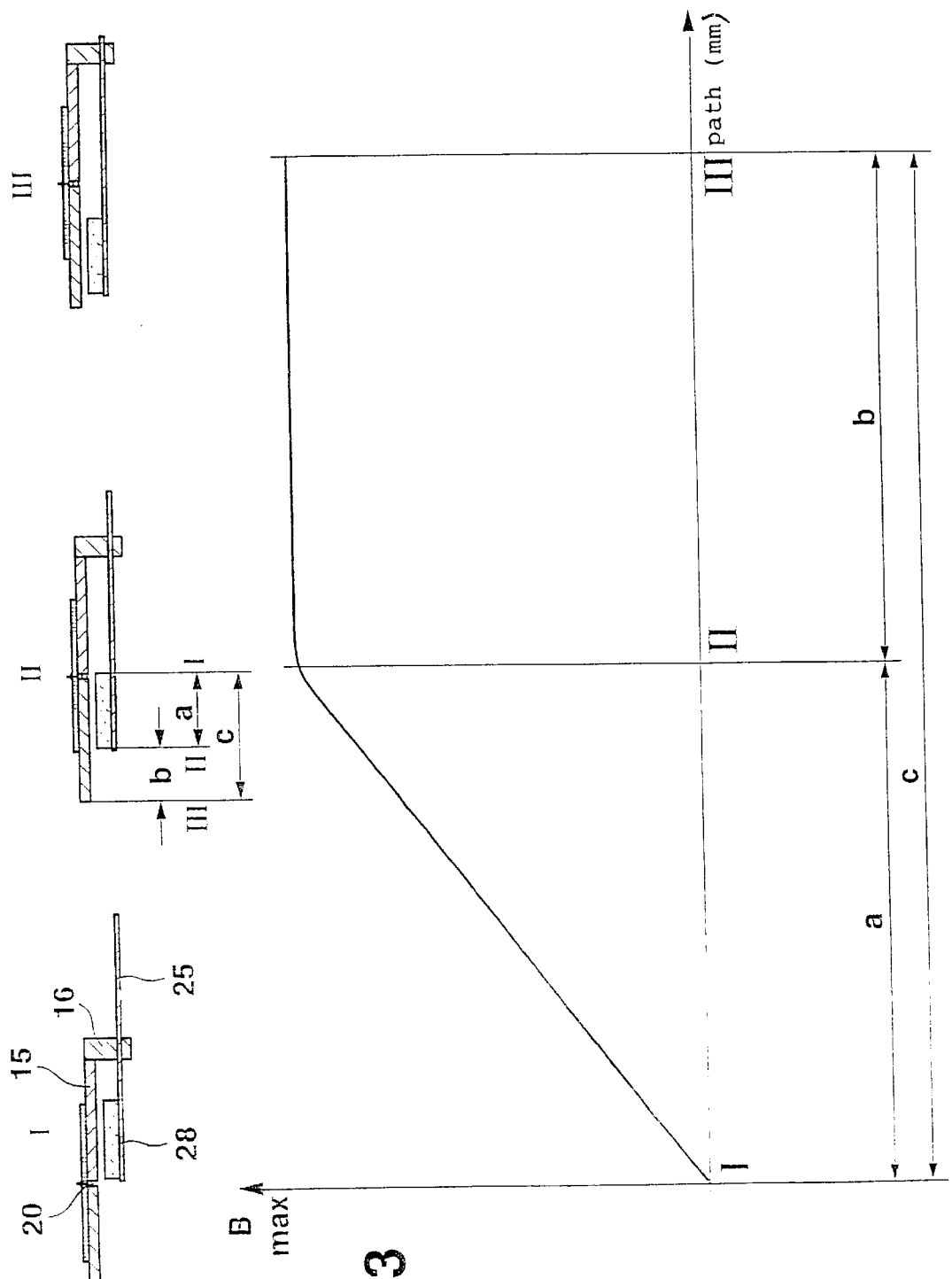
FIG. 3 shows a graph of the course of the magnetic induction B over the entire measurement range c (c=a+b) and the position of the magnet in relation to the magnetic field-sensitive measuring element in three positions I to III shown in the graph.

If the permanent magnet 28 is smaller than the total measurement range c, then a plateau region is produced, as shown in FIG. 3. If the permanent magnet 28 is then disposed close to the end 27, then the plateau region is produced at the end of the measurement curve. However, if the permanent magnet 28 is disposed on the support plate 25, spaced apart from the end 27 of the support plate 25, then the plateau region would be produced at the beginning of the measurement curve.

The graph in FIG. 3 shows the course of the characteristic curve of the magnetic induction B in the element 20, for example a Hall element, over the path c of the support plate 25 and the component disposed on it. It is clear that with a path c=0, the induction B is likewise equal to zero, whereas after a travel distance a, it reaches the maximal induction value B=Max at position II. The position at path c=0 is labeled I in the graph and the entire path c is labeled III. The path c is comprised of path a and the plateau region b. Above the graph, the respective position of the movable part 12, i.e. of the magnet 28, in relation to the element 20 is shown for the three positions I, II, and III. In position I, the magnetic flux of the magnet 28 travels from the magnet 28 through the air gap to the part 15 of the base plate. In part 15, the magnetic flux flows to the side plate 16 and from there via the support plate 25, back to the permanent magnet 28. It is clear that in position I, no magnetic flux occurs via the gap 18 and consequently through the magnetic field-sensitive element 20. In position II, the support plate 25 together with the magnet 28, is slid past the gap 18 toward the part 14 of the support plate 11 so that after a travel distance a, the end of the permanent magnet 28 has just passed the gap 18 and the permanent magnet 28 is consequently disposed only in the vicinity of the part 14 of the base plate 11 an no longer in the vicinity of the part 15 of the base plate 11. The position II is the position in which the magnetic flux of the permanent magnet 28 travels completely by means of the gap 18 and consequently travels through the element 20 and the maximal possible magnetic induction B=Max is produced in the element 20. The magnetic flux in position II consequently travels from the permanent magnet 28 via the gap into the part 14 of the base plate. From there, the magnetic flux flows via the gap 18 and the element 20 into the part 15 of the base plate and from there, via the side plate 16 and the support plate 25, back into the magnet 28. If the movable part 12, i.e. the permanent magnet 28, is slid further toward the left in the Fig., i.e. the magnet 28 is moved in the vicinity of the part 14 of the base plate 11 further away from the gap 18, then the magnetic flux in the element 20 does not change. Furthermore, the maximal possible magnetic flux flows through the element 20, in which the maximal possible magnetic flux induction B=Max is produced. As a result, a plateau region is produced between position II and position III, which has a length b. The plateau region b or, as in FIGS. 6 and 7, regions with different slopes in the measurement graph, are necessary in order to be able to control different events.

Figure 10:
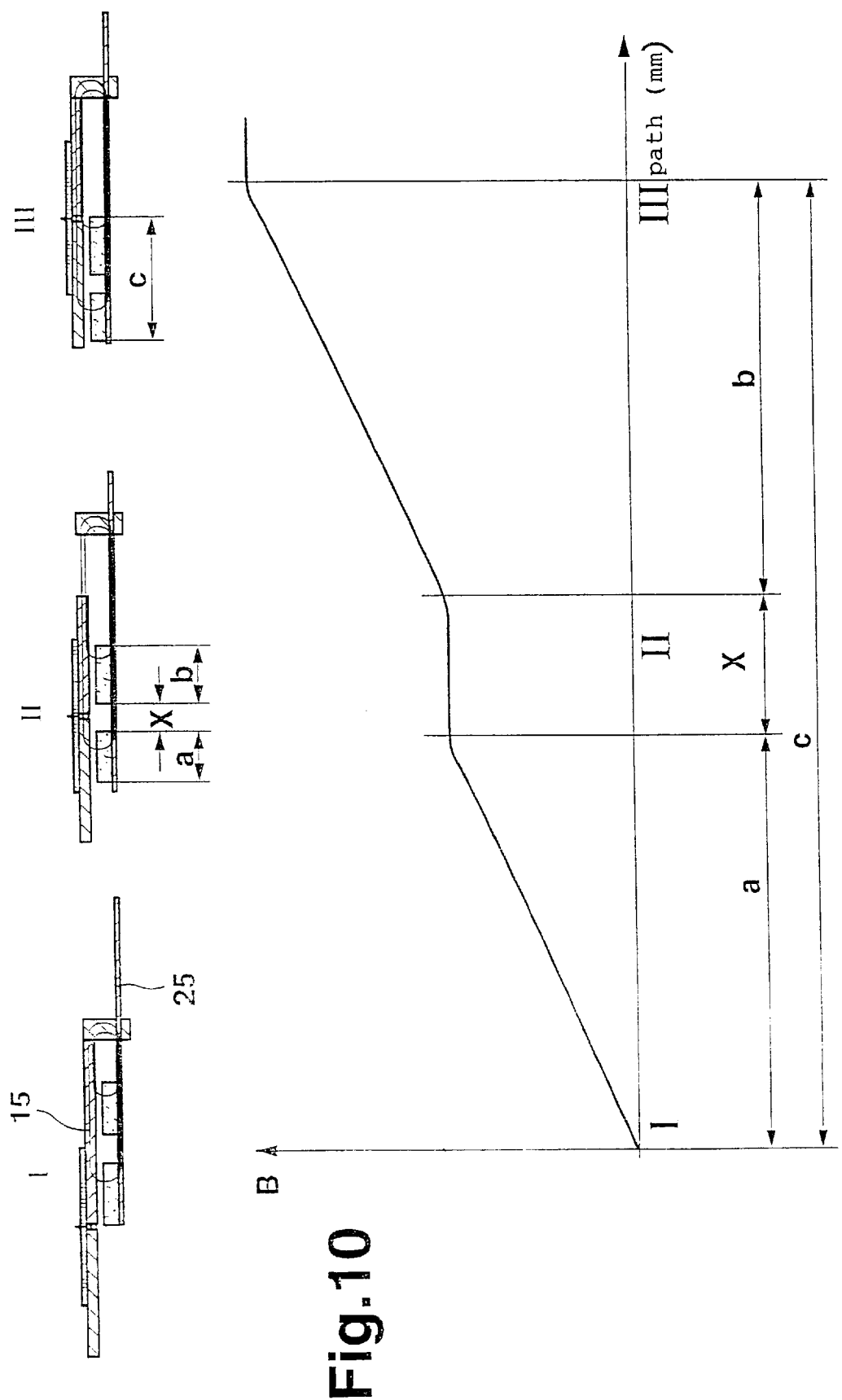
FIG. 10 shows a graph of the course of the magnetic induction B over the path c to be measured, with a plateau region X in the middle of the measurement curve. The position of the magnet in relation to the magnetic field-sensitive element is shown above it in three positions I to III.

It is essential to the invention that the length a of the permanent magnet 28 is smaller than the total measurement range c and is smaller than the part 15 of the base plate 11 serving as a flux conducting part. In the prior exemplary embodiment, the permanent magnet 28 was embodied of one part and thus was disposed on the support plate 25 so that the beginning of the permanent magnet was also disposed at the beginning of the measurement range. In the exemplary embodiment according to FIGS. 4 and 5 and the graph according to FIG. 10, the permanent magnet 38 is now comprised of two parts 36, 37. Due to this two-part design, the plateau region P, which corresponds to the path x of the sensor 10, can be shifted between two linearly extending curve sections (FIG. 10). The two permanent magnet parts 36, 37 can be of different sizes or can also be the same size. This depends on how long the path a or b of the measurement curve is intended to be. In any case, though, the total length c, which is composed of the length a+x+b, must be less than or equal to the total length c.

Figure 4:
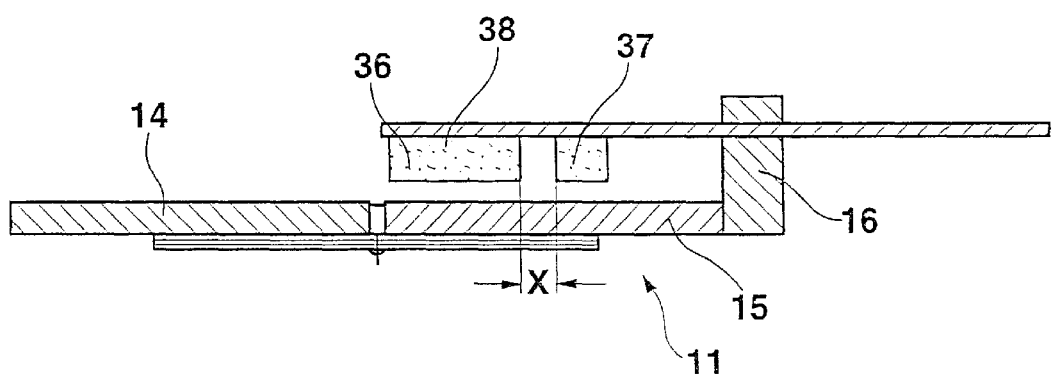
FIGS. 4 to 9 show longitudinal sections and top views of modifications to the exemplary embodiment.
Figure 5:
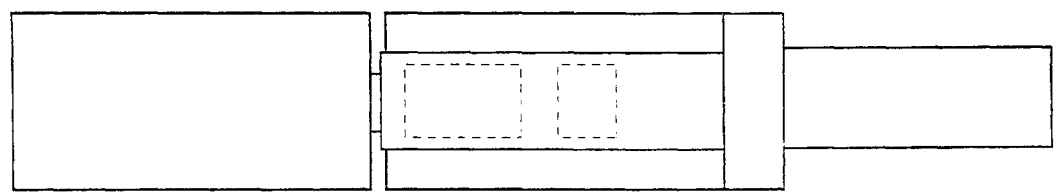
Figure 8:
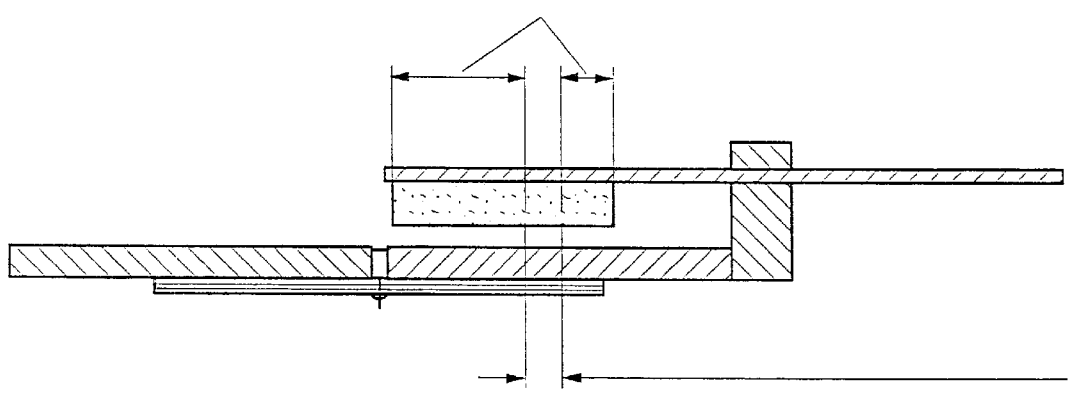
Figure 9:
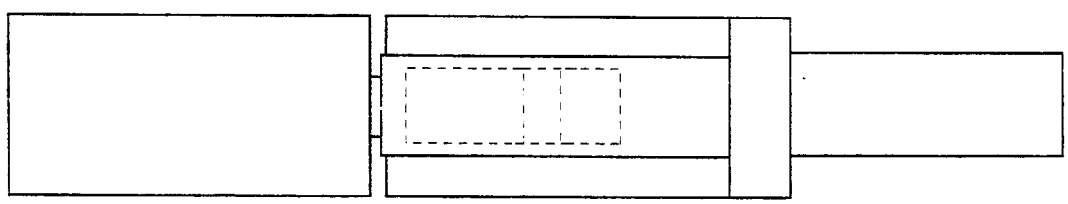

The two parts 36, 37 of the permanent magnet 38 are magnetized in the same direction, i.e. they have a magnetization direction and/or polarization direction perpendicular to the movement direction of the moved part 12, i.e. the polarization direction of the permanent magnet 28 is perpendicular to the base plate and parallel to the side plate 16. Because the measurement range x is now disposed between the two permanent magnet parts 36, 37, the plateau region P is shifted into the course of the measurement line so that a characteristic curve is produced analogous to the one shown in FIG. 10. FIG. 10 now shows a characteristic curve in which the two permanent magnet parts 36, 37 are the same size. In FIG. 4, the permanent magnet part 36 is larger than the permanent magnet part 37, which would mean that the measurement path a would be greater than the measurement path b. Moreover, it would also be possible to provide more than two permanent magnet parts, i.e. three, four, etc. It would thus be possible to produce a correspondingly desirable number of plateaus in the measurement line. Instead of a permanent magnet, it would also be possible to produce magnetized regions on the support plate 25, as depicted in FIGS. 8 and 9. This design could be used for all of the exemplary embodiments mentioned here and is shown by way of example in FIGS. 8 and 9. Particular controls can be carried out with the aid of the plateau or plateaus and/or sections that deviate from the original measurement curve.

Figure 2:
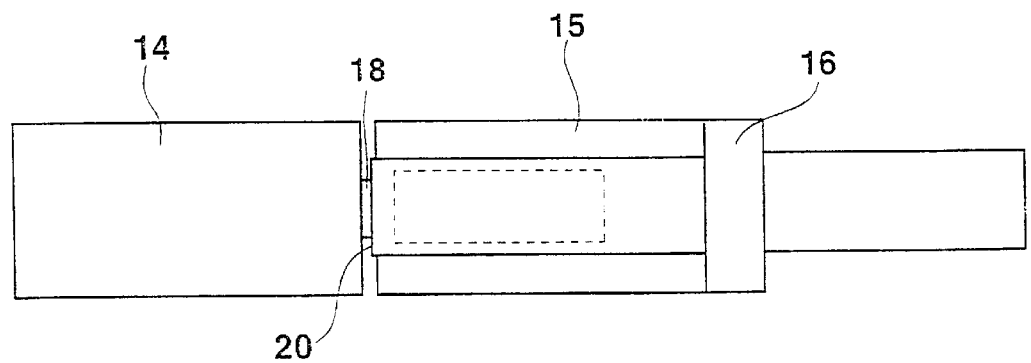

The graph in FIG. 10, in turn, shows the course of the magnetic induction B over the path c. Shown for the three positions I (path c=0) and III (path c=max, i.e. c=a+x+b) and for position II, which is disposed in the plateau region P, i.e. in the measurement path x. In position I, both of the parts 36, 37 of the permanent magnet 38 are disposed in the vicinity of the part 15 of the base plate. In this position I, there is no magnetic flux via the gap 18 and consequently through the magnetic field-sensitive element 20. This means that no magnetic induction B is produced in the element 20. The magnetic flux of both the part 36 and the part 37 takes place via the gap into the part 15 of the base plate and from there via the side plate 16 and the support plate 25, back into the two parts 36, 37 of the permanent magnet 38. If, as in position II, the one permanent magnet part 36 is disposed in the vicinity of the part 14 and the other part 37 of the permanent magnet 38 is disposed in the vicinity of the part 15 of the base plate, then the gap 18 and consequently the element 20 are disposed in the region x between the two magnet parts 36, 37. This means that in position II in the graph according to FIG. 10, there is a plateau region P which has the length x, i.e. the length between the two permanent magnet parts 36, 37. FIG. 2 shows the magnetic flux of each of the parts 36, 37 of the permanent magnet 38. The magnetic flux of the permanent magnet 37 which is associated with the plate 15 still does not travel via the element 20. The magnetic flux of the part 37 still travels from the part 37, via the gap to the part 15 of the base plate 11, and via the side plate 16 and the support plate 25, back to the part 37 of the permanent magnet 38. The magnetic flux of the other part 36 of the permanent magnet 38 travels from the part 36, via the gap into the part 14 of the support plate 11. From there, the magnetic flux travels through the gap 18 and consequently through the element 20 into the part 15 of the base plate 11 and via the side plate 16 and the support plate 25, back to the magnet part 36. Consequently, the magnetic flux does not change during the travel distance x.

In position III, after the travel distance c (c=a+x+b), both permanent magnet parts 36 and 37 are now associated with the part 14 of the base plate 11. This means that the magnetic flux of both the part 36 and the part 37 travels through the element 20 and the maximal magnetic induction B=Max is consequently produced there. The depiction of position III shows that the magnetic flux of both the part 36 and the part 37 travels from the respective part, via the gap, into the part 14 of the base plate. From there, the magnetic field travels via the gap 18 and through the element 20 into the part 15 and via the side plate 16 and the support plate 25, back to the respective parts of the permanent magnet 38.

Figure 6:
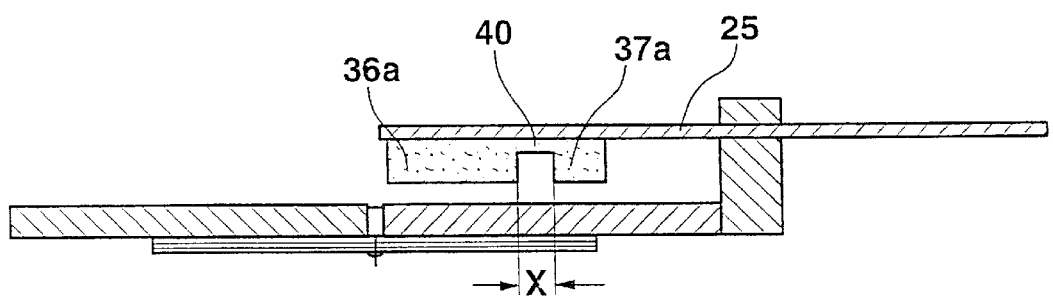
Figure 7:
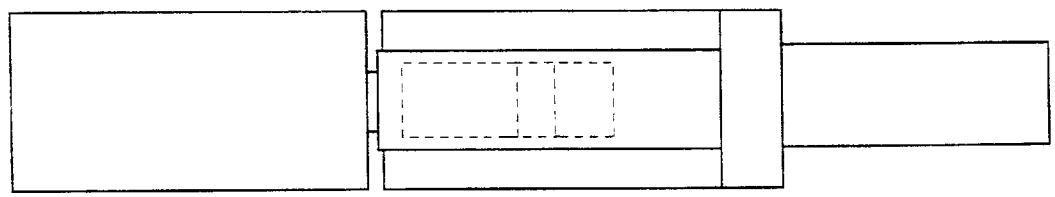

Whereas in the preceding exemplary embodiments, there is a division of the two permanent magnet parts 36 and 37, the parts can also be connected to each other with a small intermediary piece. A corresponding exemplary embodiment is shown in FIGS. 6 and 7. In FIG. 6, the intermediary piece 40 is embodied as resting against the support plate 25, i.e. it connects the surface of the two parts 36a and 37a of the permanent magnet resting against the support plate 25. Naturally it would also be possible to dispose the connecting piece 40 on the outer edge, i.e. in the region of the magnet which is oriented toward the base plate 11, or in the center, or laterally toward the back and/or front. Because of this connecting piece 40, the measurement curve in the vicinity of the travel path x no longer extends flat in the form of a plateau, as in the preceding exemplary embodiments and as shown in FIG. 10; instead, the measurement curve has a slope in region x that is a function of the width of the connecting piece 40. The slope can be influenced by the size, in particular the width. This means that it is also possible for there to be an intermediary piece which is wider than the permanent magnet parts and consequently, a steeper curve course can be achieved in this region than in the vicinity of the permanent magnet parts.

What is claimed is:

1. A path measuring instrument, comprising at least two flux conducting parts composed of a magnetically conducting material; a movable magnet; at least one magnetic field-sensitive element located in a gap between said two flux conducting parts; a support plate on which said magnet is located, said support plate being composed of a magnetically conductive material so that said support plate is a component over which a magnetic flux runs, said magnet being formed smaller than a total measurement path.

2. A path as defined in claim 1, wherein said magnet is composed of several parts which are separated from one another by a section of a non-magnetic material.

3. A path as defined in claim 1, wherein at least two parts of the magnet are connected to each other by an intermediary part.

4. A path as defined in claim 1, wherein at least one of said flux conducting parts has a recess, said support plate being guided in said recess of said at least one flux conducting part.

5. A path as defined in claim 1, wherein said magnet is polarized perpendicular to its movement direction.

6. A path as defined in claim 1, wherein said magnetic field-sensitive element is a Hall element.

7. A path measuring instrument, comprising at least two flux conducting parts composed of a magnetically conducting material; a movable magnet; at least one magnetic field-sensitive element located in a gap between said two flux conducting parts; a support plate on which said magnet is located, said support plate being composed of a magnetically conductive material so that said support plate is a component over which a magnetic flux runs, said magnet being formed smaller than a total measurement path, wherein at least one of said flux conducting parts has a recess, said support plate being guided in said recess of said at least one flux conducting part.

* * * * *